Oct. 14, 1947.  H. P. KUEHNI  2,429,066
OPTICAL TRANSPARENT FILM THICKNESS GAUGE
Filed Aug. 1, 1945
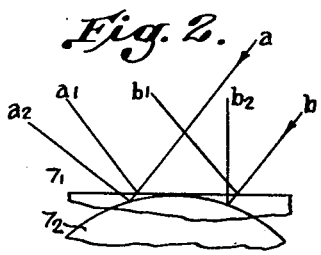
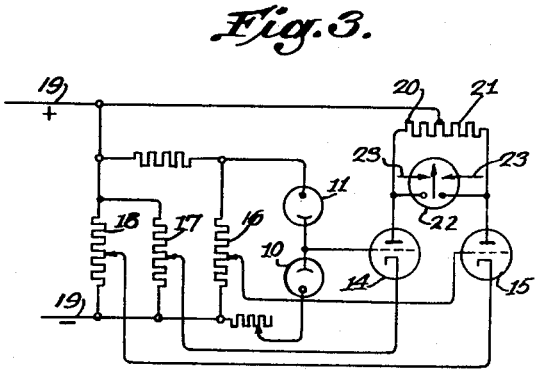
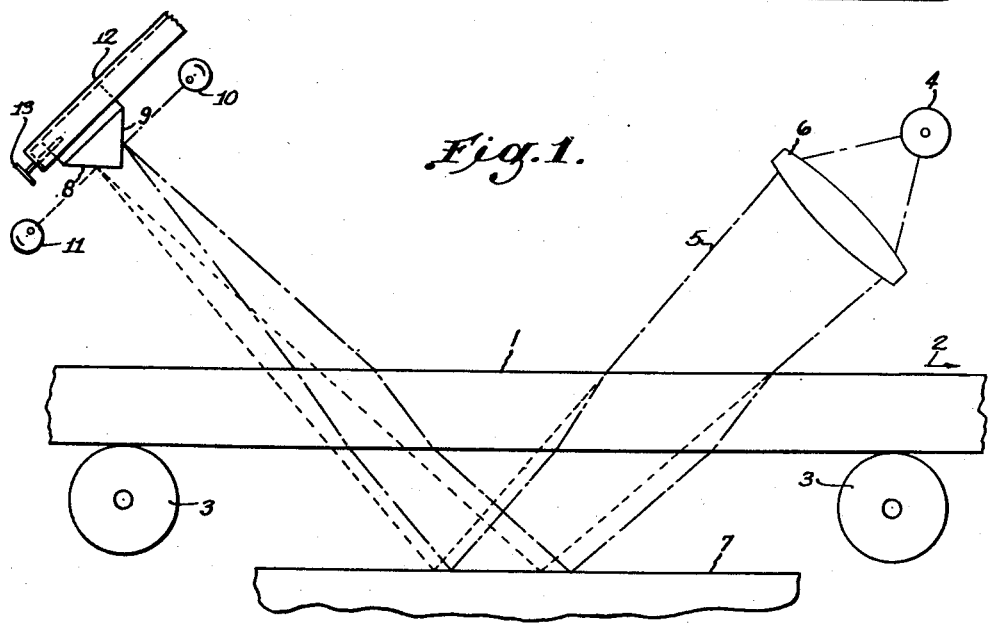
Inventor:
Hans P. Kuehni,
by Prowell A. Mack
His Attorney.

Patented Oct. 14, 1947

2,429,066

UNITED STATES PATENT OFFICE 2,429,066

OPTICAL TRANSPARENT FILM THICKNESS GAUGE

Hans P. Kuehni, Schenectady, N. Y., assignor to General Electric Company, a corporation of New York Application August 1, 1945, Serial No. 608,224

1 Claim. (Cl. 88—14)

My invention relates to gauging apparatus suitable for gauging the thickness of transparent sheet material while in motion as, for example, during the process of manufacture. The invention may also be used to measure the refraction index characteristic of transparent material of constant thickness, and is based on the principle that light transmitted at an angle through a transparent material having a constant refraction index different from that of air is displaced by an amount proportional to the thickness, or, if the thickness characteristic be constant and the refraction index variable, the displacement is proportional to such index. Thus by maintaining one of these characteristics of the transparent matter constant variations in the other characteristic may be detected.

The features of my invention which are believed to be novel and patentable will be pointed out in the claim appended hereto. For a better understanding of my invention, reference is made in the following description to the accompanying drawing in which Fig. 1 is an explanatory illustration of the principles of my invention as applied for gauging the thickness of transparent sheet material. Fig. 2 illustrates how different degrees of sensitivity may be had with differently shaped mirrors; Fig. 3 is a wiring diagram of one measuring circuit that may be employed with the apparatus of Fig. 1. Fig. 4 is a form of light source suitable for the system of Fig. 1.

Referring now to Fig. 1, I represents transparent sheet material such as glass or transparent plastic. The sheet may be stationary or in motion and may, for example, be in motion as indicated by arrow 2 over rollers 3 of a mill at some stage of its manufacture, and may be in a plastic, flexible, solid, or liquid condition. The only essential requirement is that it be transparent or semi-transparent to light rays. At 4 is a light source having its rays 5 focused in the manner hereinafter described by a condensing lens 6 and directed through the sheet I at an angle of, say, 60 degrees onto a mirror 7 and back through the sheet I to means for measuring the amount of light shift due to refraction of the light rays as they twice pass through the sheet I. A single passage of the light rays through the sheet produces a light shift but the double passage duobles the sensitivity and is generally to be preferred.

In the case of a liquid the mirror 7 may be on the bottom of the trough or tank containing the liquid or at the minimum depth of the liquid.

The light shift measuring means comprises a pair of mirrors 8 and 9 mounted on a support so as to form a light beam splitter. The beam splitter splits the beam and directs the split portions thereof to two photoelectric cells 10 and 11. As indicated, as the light beam passes through the sheet 1, it is refracted so that the reflected beam falls on the light splitter mirrors farther to the right than it otherwise would if the sheet 1 were not present and the light were reflected to the splitter without such refraction. The extent of such shift in light is proportional to the thickness of the refracting sheet 1 assuming that it has a constant index of refraction. The apparatus may be adjusted for several different ways of measurement. For example, let it be assumed that the sheet 1 as shown is of the standard thickness desired and that the position of the beam splitter is adjusted to split the light beam equally under these conditions, so that an equal amount of light falls upon each of the two cells 10 and 11. The beam splitter or divider may be mounted in a guide 12 so as to be adjusted by the thumb screw 13 to the desired position. With such adjustment it is evident that if the sheet 1 becomes thicker, more light will be directed to cell 10 and less to cell 11. On the other hand, if the sheet 1 becomes thinner, more light will be directed to cell 11 than to 10. Then the differential response of the two cells can be used to measure the thickness of the sheet 1, and a circuit suitable for this purpose is represented in Fig. 3.

The beam splitter may be shifted to a position where equal light falls upon the two photocells when there is no transparent sheet 1 present. Then when a transparent sheet is introduced into the path of the light rays, light will be shifted in one direction toward cell 10 in an amount proportional to the sheet thickness. The fact that the sheet 1 may move up and down does not influence the measurement so long as the sheet remains parallel to itself. An increase in sensitivity is obtained by decreasing the angle at which the light strikes the sheet 1. However, if this angle is made too small, the light tends to be reflected from the surface of the sheet instead of passing through. A preferred way of increasing the sensitivity is to make the mirror 7 with a cylindrical reflecting surface rather than flat. The reason for such increase in sensitivity is illustrated in Fig. 2 where $7_1$ represents the reflecting surface of a plain or flat mirror and $7_2$ the reflecting surface of a convex or cylindrical mirror, the surfaces being superimposed for the purpose of comparison. If a light beam $a$ strikes surface $7_1$, it will be reflected in direction $a_1$. The same beam striking surface $7_2$ is reflected in direction $a_2$. Similarly, a parallel light beam $b$ striking surface $7_1$ is reflected to $b_1$ and from surface $7_2$ to $b_2$.

It is thus seen that the shift of the beam to the right in Fig. 1 due to an increase in thickness of sheet 1 can be magnified by the use of the cylindrical surface mirror at 7. The degree of amplification represented in Fig. 2 is more than is necessary or desirable, but this exaggerated example will serve to illustrate the principle involved.

The photoelectric cells 10 and 11 are represented by like reference characters in the measuring circuit of Fig. 3 where it will be noted that the relative amounts of light falling on these cells control the grid bias of a triode 14 such that with increasing light on cell 10 the grid of tube 14 becomes increasingly negative and reduces current flow through the tube. Another tube 15 passes current in accordance with its grid bias which is adjustable by a potentiometer 16. The cathode voltages of tubes 14 and 15 are adjustable by potentiometers 17 and 18. The two tubes 14 and 15 thus pass current from the source of direct current supply 19 through resistances 20 and 21, respectively and the tube ends of these resistances thus have a voltage difference which varies with the relative amounts of current flowing through the two tubes. A direct current millivoltmeter 22 is connected across these resistances and responds to the voltage difference, if any. The circuit can be adjusted so that with equal light falling on the two cells the voltage drop across instrument 22 will be zero. If then 22 is a zero center instrument and the sheet 1, Fig. 1, is of the desired thickness for such adjustment, instrument readings to one side of zero will indicate less than normal thickness and readings on the other side of zero will indicate greater than normal thickness of the sheet 1, and the instrument scale may be calibrated in percentage or actual thickness. It is to be observed that with such calibration, changes in the light source 4 or changes in transparency of sheet 1 will have minimum effect on the calibration because such changes will influence both cells 10 and 11 alike and maintain the grid voltage on tube 14 essentially constant for constant sheet thickness.

If the apparatus and circuit be adjusted so that equal light falls on the cells 10 and 11 when there is no sheet 1 present, I may use an ordinary instrument at 22 and adjust the current through tube 15 for zero instrument reading under the no sheet 1 condition, and then have instrument 22 deflect upscale as the current in tube 14 is reduced with the presence and increasing thickness of a transparent sheet at 1. Other calibration adjustments and other forms of measuring circuits may be employed. The instrument 22 may have control contacts as indicated at 23 for alarm or thickness control purposes.

In the foregoing it has been assumed that the apparatus is used for measuring the thickness of similar transparent materials or materials having essentially the same index of refraction, such as measuring the thickness of standard window glass or other transparent sheet material. This will be its chief use because variation in the index of refraction of many of these standard products made from the same formula will be negligible.

It is, however, conceivable that occasions may arise where it is desirable and possible to obtain a measurement of the index of refraction of transparent materials. In such cases it would be necessary to maintain the thickness constant or of a known value and adjust the apparatus for highest sensitivity. The density of a transparent liquid might possibly be measured and controlled in this way during a process of manufacture in which such liquid undergoes treatment.

The light rays emanating from the lens 6 converge at such an angle as to be focused in a point or a line preferably parallel to the knife-edge of the beam splitter 8—9. For focusing the beam in a line, a lamp with a single straight filament such as is shown in Fig. 4 may be used with a lens having cylindrical surfaces. The filament image is then focused on the knife-edge of the splitting mirror using a certain standard thickness transparent sheet at 1. The use of converging light rays for this purpose is not affected by the introduction of the light transparent sheet except that the image shifts in proportion to the thickness of the sheet. Fig. 1 indicates the geometry of the path of the converging light rays both with and without an intervening transparent sheet. Using a straight filament lamp as shown in Fig. 4, the image thereof at the knife-edge may be made parallel to such knife-edge or nonparallel to any extent up to 90 degrees by rotating the lamp and the lens or by rotating the knife-edge, and in this way the sensitivity of the control may be varied over a wide range.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

In a gauging system where light rays are passed through a transparent substance at a refracting angle for the purpose of gauging a characteristic of such substance, an incandescent lamp with a straight filament, a light divider comprising a pair of mirrors with their mirror surfaces at an angle to each other and meeting in a line, a light ray directing system between said lamp and light divider including a condensing lens near the lamp and a mirror for reflecting light rays after passage through said lens to said light divider, the shape of said lens and the geometry of said light ray directing system being such that the image of the straight filament of said lamp is focused on the light divider and positioned so that it may be brought into coincidence with the dividing line betwen the mirror surfaces of said light divider by shifting the light beam transversely thereof, the spacing between the lens, mirror and light divider being such that a substance to be gauged may be interposed in both of the light paths from the lens to the mirror and from the mirror to the light divider for the purpose of shifting the line image of the lamp filament on the light divider from one mirror to the other of said light divider in response to variations in a characteristic of such substance which influences the extent to which the light is shifted by refraction in its passage through such substance.

HANS P. KUEHNI.

REFERENCES CITED

The following references are of record in the file of this patent:

UNITED STATES PATENTS

| Number | Name | Date |
|---|---|---|
| 1,503,543 | Lytle | Aug. 5, 1924 |
| 1,939,088 | Styer | Dec. 12, 1933 |
| 2,169,101 | LaPierre | Aug. 8, 1939 |
| 2,304,814 | Glasser | Dec. 15, 1942 |